(12) United States Patent
Crundwell et al.

(10) Patent No.: US 11,929,982 B2
(45) Date of Patent: Mar. 12, 2024

(54) CONTROLLERS OF A VACUUM PUMPING AND/OR ABATEMENT SYSTEM

(71) Applicant: Edwards Limited, Burgess Hill (GB)

(72) Inventors: Peter Reginald Crundwell, Eastbourne (GB); Richard John Moran, Burgess Hill (GB); Peter George Stammers, Eastbourne (GB); Steven Graham Barlow, Burgess Hill (GB); Brent Haslett, Eastbourne (GB)

(73) Assignee: Edwards Limited, Burgess Hill (GB)

( * ) Notice: Subject to any disclaimer, the term of this patent is extended or adjusted under 35 U.S.C. 154(b) by 152 days.

(21) Appl. No.: 17/297,302

(22) PCT Filed: Nov. 12, 2019

(86) PCT No.: PCT/GB2019/053203
§ 371 (c)(1),
(2) Date: May 26, 2021

(87) PCT Pub. No.: WO2020/109752
PCT Pub. Date: Jun. 4, 2020

(65) Prior Publication Data
US 2022/0035349 A1 Feb. 3, 2022

(30) Foreign Application Priority Data
Nov. 27, 2018 (GB) ..................... 1819245

(51) Int. Cl.
*H04L 61/5038* (2022.01)
*F04B 37/14* (2006.01)
(Continued)

(52) U.S. Cl.
CPC .... *H04L 61/5038* (2022.05); *G05B 19/41845* (2013.01); *G05B 19/41855* (2013.01);
(Continued)

(58) Field of Classification Search
CPC . H04L 61/5038; G05B 19/418; G05B 19/054; G05B 19/41845;
(Continued)

(56) References Cited

U.S. PATENT DOCUMENTS 4,473,338 A * 9/1984 Garmong .............. F04B 49/065
417/63
6,415,439 B1 * 7/2002 Randell ................... H04L 69/22
725/74
(Continued)

FOREIGN PATENT DOCUMENTS

AU 5451200 A 12/2000
CN 102577623 A 7/2012
(Continued)

OTHER PUBLICATIONS

Combined Search and Examination Report under Sections 17 and 18(3) dated May 24, 2019 from counterpart GB Application No. 1819245.0, 5 pp.
(Continued)

*Primary Examiner* — James N Fiorillo
(74) *Attorney, Agent, or Firm* — Shumaker & Sieffert, P.A.

(57) ABSTRACT

A method of assigning an identifier to a controller of a modular vacuum pumping and/or abatement system, the method including: determining, by a first controller of the modular vacuum pumping and/or abatement system, that a first identifier is to be assigned to a second controller of the modular vacuum pumping and/or abatement system, wherein the second controller is located at a module of the modular vacuum pumping and/or abatement system; transmitting, by the first controller, a first signal indicative of the first identifier to the second controller; receiving, by a user input device coupled to the module, a user input; and
(Continued)

adopting, by the second controller, the first identifier as its identifier in response to the user input.

14 Claims, 3 Drawing Sheets

(51) Int. Cl.
 *F04B 49/06* (2006.01)
 *G05B 19/418* (2006.01)
 *G06F 15/177* (2006.01)
(52) U.S. Cl.
 CPC ............ *G06F 15/177* (2013.01); *F04B 37/14* (2013.01); *F04B 49/065* (2013.01)
(58) Field of Classification Search
 CPC ........... G05B 19/418855; G06F 15/177; G06F 9/4405; F04B 37/14; F04B 49/04; F04B 49/06; F04B 49/065; F04D 13/00; F04D 15/00; F04D 25/00; F04D 27/00; D05D 2210/12; G05D 16/2026
 USPC .......................................................... 709/220
 See application file for complete search history.

(56) References Cited

U.S. PATENT DOCUMENTS

| | | | |
|---|---|---|---|
| 6,671,735 | B1 | 12/2003 | Bender |
| 2004/0260404 | A1* | 12/2004 | Russell ............... H04L 41/0856 700/1 |
| 2007/0149123 | A1* | 6/2007 | Palin ...................... H04B 1/406 455/41.2 |
| 2008/0058993 | A1* | 3/2008 | Tain .................. G05B 19/41845 700/275 |
| 2008/0125057 | A1* | 5/2008 | Nass ................... H04L 61/5038 455/73 |
| 2010/0106810 | A1 | 4/2010 | Grohman |
| 2012/0153838 | A1 | 6/2012 | Schenk et al. |
| 2012/0230846 | A1* | 9/2012 | Stephens ................. F04B 49/08 417/279 |
| 2012/0271924 | A1* | 10/2012 | Spitaels .............. H04L 61/5092 709/220 |
| 2012/0290126 | A1* | 11/2012 | Combs ................... B65G 43/10 700/230 |
| 2012/0299509 | A1* | 11/2012 | Lee ........................ H05B 47/19 315/291 |
| 2013/0092704 | A1* | 4/2013 | Tincher ................ F04B 49/065 417/474 |
| 2014/0091770 | A1 | 4/2014 | Lee et al. |
| 2014/0281078 | A1* | 9/2014 | Biskup ...................... G06F 3/00 710/110 |
| 2014/0336821 | A1* | 11/2014 | Blaine .................... G05B 15/02 700/275 |
| 2014/0352820 | A1* | 12/2014 | Nakazawa ............. B01D 53/74 422/168 |
| 2015/0124651 | A1* | 5/2015 | Zhang ..................... H04L 49/70 370/254 |
| 2015/0222541 | A1* | 8/2015 | West ....................... H04L 45/74 370/254 |
| 2016/0142370 | A1 | 5/2016 | Linder et al. |
| 2016/0283427 | A1* | 9/2016 | Chaudhari ............ G06F 13/404 |
| 2018/0013578 | A1 | 1/2018 | Gozloo et al. |
| 2018/0240329 | A1* | 8/2018 | Steinmetz ............ H05K 5/0017 |
| 2018/0359948 | A1* | 12/2018 | Millar .................... A01G 9/088 |
| 2019/0072989 | A1* | 3/2019 | Nagai .................. G05B 19/054 |
| 2020/0112543 | A1* | 4/2020 | Weed .................. H04L 63/1466 |
| 2020/0174454 | A1* | 6/2020 | Kim .................... G06F 13/4027 |

FOREIGN PATENT DOCUMENTS

| | | |
|---|---|---|
| CN | 103629132 A | 3/2014 |
| CN | 103718425 A | 4/2014 |
| CN | 104285190 A | 1/2015 |
| CN | 108737583 A | 11/2018 |
| KR | 20150006196 A | 1/2015 |
| WO | 2013147734 A1 | 10/2013 |
| WO | 2015104204 A1 | 7/2015 |

OTHER PUBLICATIONS

International Search Report and Written Opinion dated Jan. 29, 2020 from counterpart International Application No. PCT/GB2019/053203, 10 pp.

First Office Action and Search Report, and translation thereof, from counterpart Chinese Application No. 201980090489.7 dated Dec. 5, 2022, 22 pp.

First Office Action and Search Report, and translation thereof, from counterpart Taiwan Application No. 108143175 dated Aug. 7, 2023, 20 pp.

Search Report from counterpart Chinese Application No. 201980090489.7 dated Oct. 23, 2023, 3 pp.

Lu, "Elevator based on microcontroller control system implementation", Electronic Measurement Technology, Mar. 15, 2016, pp. 65-69, Translation provided for only the Abstract.

Wang et al., "Based on fixed power telephone and wireless controlled home appliances", China Science and Technology Information, Sep. 15, 2012, 1 pp. Translation not available.

* cited by examiner

CONTROLLERS OF A VACUUM PUMPING AND/OR ABATEMENT SYSTEM

This application is a national stage entry under 35 U.S.C. § 371 of International Application No. PCT/GB2019/053203, filed Nov. 12, 2019, which claims the benefit of GB Application No. 1819245.0, filed Nov. 27, 2018, the entire contents of each of which are incorporated herein by reference.

TECHNICAL FIELD

The present disclosure relates to controllers of vacuum pumping and/or abatement systems.

BACKGROUND

Vacuum pumping and/or abatement systems are used in varied and different technological fields, for example semiconductor fabrication. Typically, in said systems, vacuum pumping equipment is used to pump gas (e.g. gas from an industrial process) out of a particular location, and abatement equipment is used to abate (e.g. destroy or dispose of) undesirable substances (e.g. exhaust gas) which have been produced.

Depending on the processes involved, there may be different criteria for vacuum pumping and abatement. For example, it is typically desirable to use different vacuum pumping equipment and different abatement equipment for different processes involving different process gases, different gas pressures, and different gas flow. Also, it is typically desirable to use different abatement equipment to destroy or dispose of different undesirable substances.

Vacuum pumping and/or abatement systems are typically designed bespoke according to the particular processes with which they will be used. However, the amount of time spent designing, manufacturing and installing such a bespoke system is typically prolonged because different processes require different vacuum pumping and abatement system solutions.

In addition to vacuum pumping and/or abatement equipment, vacuum pumping and/or abatement systems also typically include electronic controllers for controlling system operation.

SUMMARY

According to a first aspect of the disclosure, there is provided a method of assigning an identifier to a controller of a modular vacuum pumping and/or abatement system, the method comprising: determining, by a first controller of the modular vacuum pumping and/or abatement system, that a first identifier is to be assigned to a second controller of the modular vacuum pumping and/or abatement system, wherein the second controller is located at a module of the modular vacuum pumping and/or abatement system; transmitting, by the first controller, a first signal indicative of the first identifier to the second controller; receiving, by a user input device coupled to the module, a user input; and adopting, by the second controller, the first identifier as its identifier in response to the user input.

The method may further comprise: in response to the determination that the first identifier is to be assigned to the second controller, displaying, by a user interface, an indication that the second controller is to be assigned the first identifier.

The method may further comprise transmitting, by the second controller to the first controller, an acknowledgement that the second controller has adopted the first identifier as its identifier.

The method may further comprise determining, by the first controller, that there is a third controller connected to the second controller via a connection; transmitting, by the first controller, a second signal indicative of a second identifier to the second controller and the third controller, wherein the second signal is also indicative of the connection between the second controller and the third controller; transmitting, by the second controller via the connection between the second controller and the third controller, a signal to the third controller; and in response to the signal transmitted via the connection, adopting, by the third controller, the second identifier as its identifier.

The method may further comprise transmitting, by the third controller to the first controller, an acknowledgement that the third controller has adopted the second identifier as its identifier.

The method may further comprise: in response to the acknowledgement that the third controller has adopted the second identifier as its identifier, transmitting, by the first controller, a further second signal indicative of a further second identifier to the second controller and a further third controller, wherein the further second signal is indicative of a connection between the second controller and the further third controller; transmitting, by the second controller via the connection between the second controller and the further third controller, a further signal to the further third controller; and in response to the further signal transmitted via the connection between the second controller and the further third controller, adopting, by the further third controller, the further second identifier as its identifier.

The method may further comprise transmitting, by the further third controller to the first controller, a further acknowledgement that the further third controller has adopted the further second identifier as its identifier.

The method may further comprise starting a timer in response to the transmission of the first signal. The second controller may only adopt the first identifier as its identifier if a user input is received at the user input device within a predetermined amount of time from the start of the timer.

The user input device may be a button. The user input may comprise pressing the button.

The user input device may comprise a light emitting device.

The first controller may be configured to control the operation of all or part of the modular vacuum pumping and/or abatement system.

The second and third controllers may be part of a module control system configured to control the operation of only one of the modules of the modular vacuum pumping and/or abatement system.

The first and second controllers may be connected to each other via a communications network.

The first signal may be a broadcast signal.

The second signal may be a broadcast signal.

According to a second aspect of the disclosure, there is provided a system for assigning an identifier to a controller of a modular vacuum pumping and/or abatement system, the system comprising: a first controller; a second controller located at a module of the modular vacuum pumping and/or abatement system; and a user input device coupled to the module, wherein the system is configured to perform a method in accordance with the first aspect.

According to a third aspect of the disclosure, there is provided a modular vacuum pumping and/or abatement system comprising a system in accordance with the second aspect.

DETAILED DESCRIPTION

Figure 1:
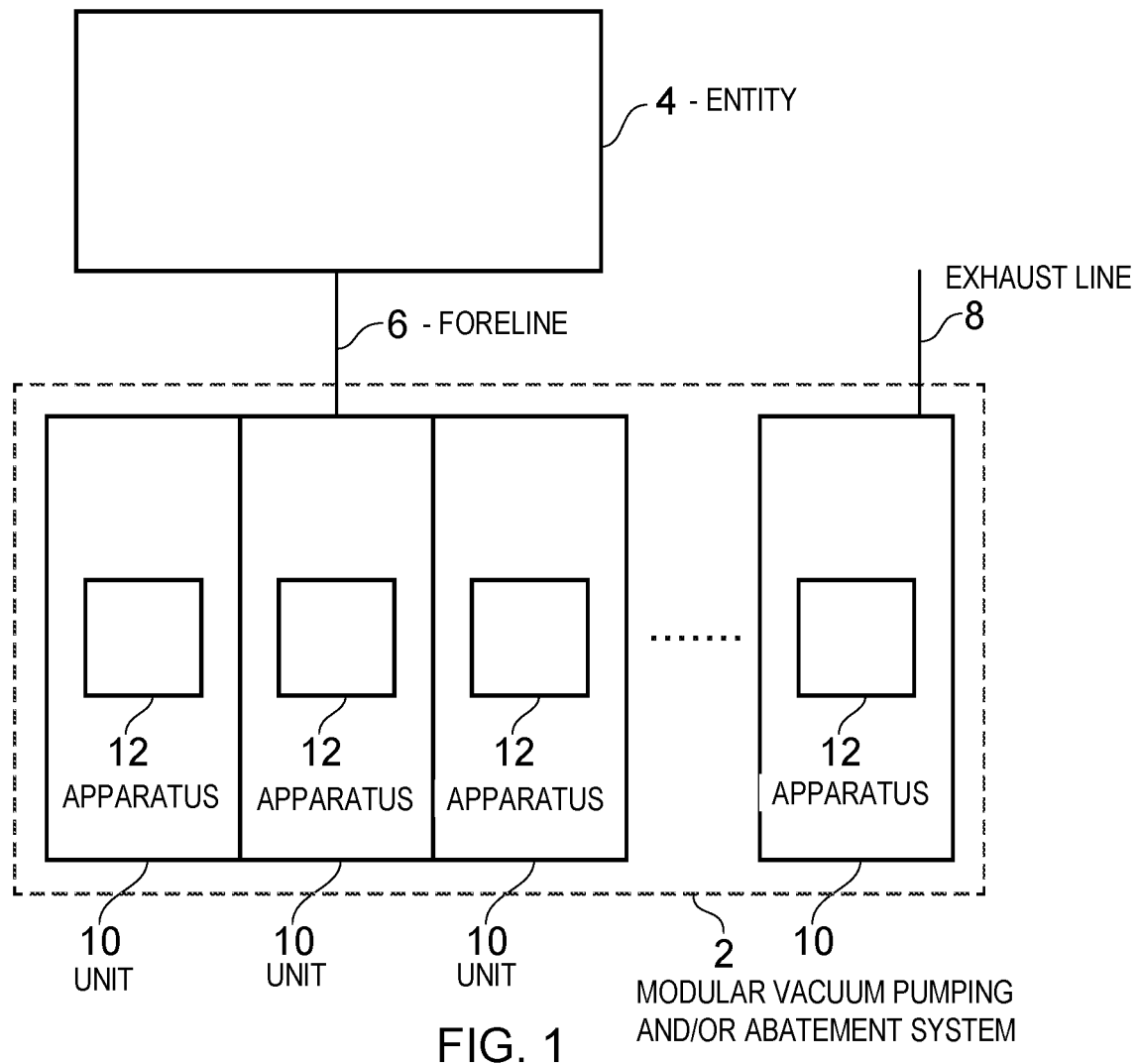
FIG. 1 is a schematic illustration (not to scale) showing a vacuum pumping and/or abatement system.

FIG. 1 is a schematic illustration (not to scale) showing a modular vacuum pumping and/or abatement system 2. The system 2 is fluidly connected to an entity 4 via one or more fluid input lines 6 (commonly referred to as "forelines") between the system 2 and the entity 4. The entity 4 may, for example, be a chamber or room used in an industrial process such as semiconductor fabrication. The system 2 is also fluidly connected to an exhaust line 8.

In operation, the system 2 pumps gas out of the entity 4 via the fluid input line 6 and/or abates (e.g. destroys or disposes of) undesirable substances produced by the entity 4 which may be present in the pumped gas. The system 2 also pumps exhaust gas (which may be gas which has undergone an abatement process) out of the system 2 into the exhaust line 8, thereby to remove the exhaust gas from the system 2.

The system 2 comprises a plurality of modules 10, which may also be referred to as "units" or "slices". Each module 10 comprises one or more apparatuses 12. Each apparatus 12 is configured to perform a respective function within the system 2. For example, an apparatus 12 may be a vacuum pump for pumping gas out of the entity 4, an abatement apparatus for abating undesirable substances produced by the entity 4, or an inverter for converting AC electrical power of a certain frequency into AC electrical power of another frequency. However, the one or more apparatuses 12 are not limited to such. In general, each of the apparatuses 12 may be any apparatus which is used in a vacuum pumping and/or abatement system. In some embodiments, two or more of the apparatuses 12 are substantially identical and/or perform substantially the same function as each other.

As mentioned above, the system 2 includes a plurality of electronic controllers for controlling operation of the system 2. These controllers will now be described in more detail with reference to FIG. 2.

Figure 2:
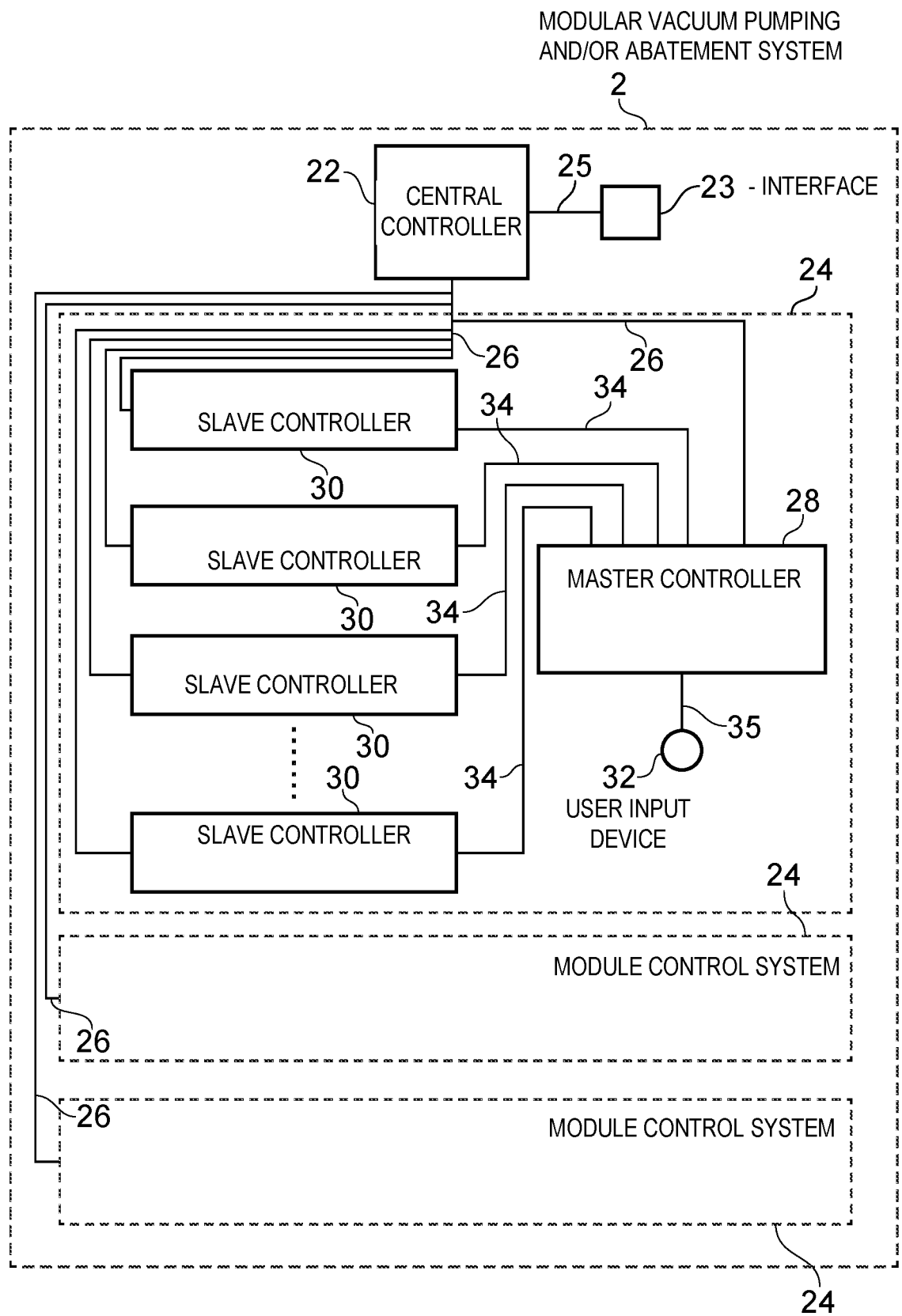
FIG. 2 is a schematic illustration (not to scale) showing controllers of the vacuum pumping and/or abatement system.

FIG. 2 is a schematic illustration (not to scale) showing the plurality of controllers of the vacuum pumping and/or abatement system 2.

In this embodiment, the system 2 comprises a central controller 22, a user interface 23 and a plurality of module control systems 24. For ease of understanding and clarity, only one of the module control systems 24 has been shown in detail in FIG. 2.

The central controller 22 is configured to control the operation of all or part of the vacuum pumping and/or abatement system 2. For example, the central controller 22 may be configured to control apparatuses 12 of multiple different modules 10 of the vacuum pumping and/or abatement system 2. In this embodiment, the central controller 22 is located at (e.g. in or on) one of the modules 10 of the system 2. The user interface 23 is connected to the central controller 22 by a user interface link 25. The user interface link 25 may be a wired or wireless link. The user interface 23 is configured to receive one or more user inputs from a user and transmit one or more signals, via the user interface link 25, to the central controller 22 based on the received one or more user inputs. The central controller 22 is configured to perform one or more actions in response to and dependent on the one or more signals received from the user interface 23. In this way, a user is able to command the central controller 22 to perform one or more actions by using the user interface 23. The user interface 23 may be any appropriate user interface (e.g. a touchscreen or a keyboard and monitor).

In this embodiment, each module control system 24 is configured to control the operation of only one of the modules 10 of the vacuum pumping and/or abatement system 2. In particular, each module control system 24 is configured to control a different respective module 10 of the vacuum pumping and/or abatement system 2. More specifically, each module control system 24 is configured to control each of the one or more apparatuses 12 of the module 10 that it is configured to control. Each module control system 24 is located at (e.g. in or on) the module 10 that it is configured to control. In this embodiment, each module control system 24 is located remotely from the central controller 22 (i.e. at a different module 10 to the module 10 that the central controller 22 is located at).

Each module control system 24 comprises a module master controller 28, a plurality of module slave controllers 30, and a user input device 32.

The module master controller 28 is configured to control the operation of one or more apparatuses 12 of the module 10 that the module control system 24 is configured to control. Each module slave controller 30 is configured to control a different respective apparatus 12 of the module 10 that the module control system 24 is configured to control. The apparatuses 12 controlled by the module slave controllers 30 are not controlled by the module master controller 28, and vice versa.

The central controller 22 and the plurality of module control systems 24 are connected to each other via a communications network 26. More specifically, the central controller 22, the module master controllers 28 of the module control systems 24 and module slave controllers 30 of the module control systems 24 are connected to each other via the communications network 26. The central controller 22, the module master controllers 28 of the module control systems 24 and the module slave controllers 30 of the module control systems 24 are configured to transmit one or more signals, via the communications network 26, to each other. The central controller 22, the module master controllers 28 of the module control systems 24 and module slave controllers 30 of the module control systems 24 are also configured to receive one or more signals from each other via the communications network 26. In other words, the central controller 22, the module master controllers 28 of the module control systems 24 and the module slave controllers 30 of the module control systems 24 are in bidirectional communication with each other via the communications network 26. In this embodiment, the communications network 26 is a wired communications network (e.g. an ethernet network).

The module master controller 28 and the module slave controllers 30 of each module control system 24 are connected to each other via a plurality of first connections 34. Each of the first connections 34 may, for example, be a discrete digital connection. More specifically, each module slave controller 30 is connected to the module master controller 28 via a respective first connection 34. The module master controller 28 is configured to transmit one or more signals, via a respective first connection 34, to each module slave controller 30. In this embodiment, the first connections 34 are wired connections (e.g. electrical cables). Each first connection 34 connects a respective output (e.g. a digital output) of the module master controller 28 to a respective input (e.g. a digital input) of one of the module slave controllers 30. The way in which the first connections 34 are used will be described in more detail below with reference to FIG. 3.

The user input device 32 is connected to the module master controller 28 via a second connection 35. The second connection 35 may, for example, be a discrete digital connection. The user input device 32 is configured to receive a user input from a user. The user input device 32 is also configured to transmit, via the second connection 35, a signal to the module master controller 28 in response to the received user input. The user input device 32 is coupled (e.g. mechanically coupled) to the module 10 that the module control system 24 is configured to control. Also, the user input device 32 is located at (e.g. in or on) the module 10 that the module control system 24 is configured to control. The way in which the user input device 32 and second connection 35 are used will be described in more detail below with reference to FIG. 3.

In this embodiment, the user input device 32 comprises a light emitting device (not shown) configured to emit light from the user input device 32, thereby to allow the user input device 32 to be more visible to a user. In this embodiment, the user input device 32 comprises a button that is operable by a user to provide the user input (i.e. by pressing the button).

Each of the controllers described above comprises one or more processors for implementing instructions and using data, including instructions and/or data in the form of a computer program or plurality of computer programs stored in or on a machine-readable storage medium such as computer memory, a computer disk, ROM, PROM etc., or any combination of these or other storage media. Each controller may also comprise computer readable storage medium for storing instructions and/or data. During installation of the vacuum pumping and/or abatement system 2, an identifier (e.g. a unique name or address) is assigned to the module master controller 28 of each module control system 24, so that the module master controllers 28 can be identified by other controllers of the system 2 when they communicate. A respective identifier is also assigned to each of the module slave controllers 30 of each module control system 24, so that the module slave controllers 30 can be identified by other controllers of the system 2 when they communicate. Each identifier may be associated with a particular physical location (e.g. a particular module) in the vacuum pumping and/or abatement system 2 so that, once assigned an identifier, each controller is also associated with a particular physical location. This process of assigning identifiers to controllers can be referred to as "commissioning" of the controllers.

For the purpose of commissioning, the central control system 22 comprises pre-stored information which enables the central control system 22 to determine the way in which all of the controllers in the vacuum pumping and/or abatement system 2 are arranged. More specifically, the pre-stored information comprises a list of the modules 10 of the vacuum pumping and/or abatement system 2, a list of the master controllers 28 in the vacuum pumping and/or abatement system and their associated modules 10, a list of the slave controllers 30 in the vacuum pumping and/or abatement system 2 and their associated master controllers 28, and a list of the outputs of each of the master controllers 28. The pre-stored information also comprises a plurality of identifiers which are to be assigned to the controllers in the vacuum pumping and/or abatement system 2. A method of assigning identifiers to the controllers of one of the module control systems 24 will now be described with reference to FIG. 3. It will be appreciated that this method may be performed (e.g. sequentially repeated) for each of the other module control systems 24 of the vacuum pumping and/or abatement system 2 as well, but for ease of understanding and clarity the commissioning of only one module control system 24 will be described with reference to FIG. 3.

Figure 3:
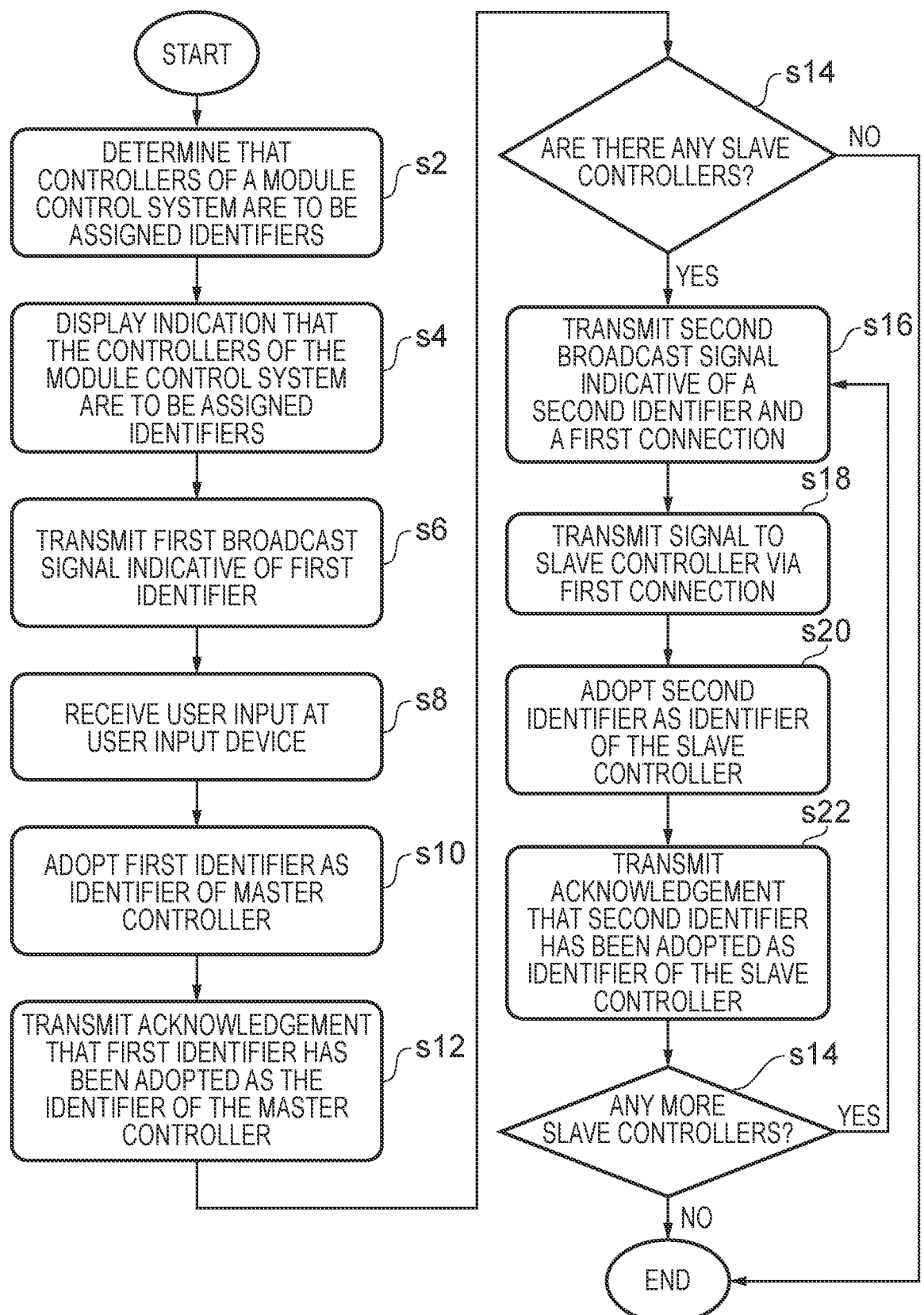
FIG. 3 is a flowchart showing a method of assigning identifiers to controllers of a module control system of the vacuum pumping and/or abatement system.

FIG. 3 is a flowchart showing an embodiment of a method of assigning identifiers to the controllers 28, 30 of one of the module control systems 24 (which is hereinafter referred to as the "current" module control system 24).

At step s2, the central controller 22 determines that each of the controllers 28, 30 of the current module control system 24 is to be assigned a respective identifier. More specifically, the central controller 22 selects one of the modules 10 from the list of modules in the pre-stored information described above and determines that the module control system 24 of the selected module 10 is to be the current module control system 24 for which commissioning is to be performed.

At step s4, in response to the determination at step s2, the user interface 23 displays an indication that the controllers 28, 30 of the current module control system 24 are to be assigned identifiers. For example, the user interface 23 may display a list of the modules 10 of the vacuum pumping and/or abatement system 2 and highlight the module 10 that the current module control system 24 is configured to control.

At step s6, the central controller 22 transmits, via the communications network 26, a first broadcast signal to all of the controllers in the vacuum pumping and/or abatement system 2. Thus, the module master controller 28 receives the first broadcast signal via the communications network 26. The first broadcast signal is indicative of a first identifier. In addition, the first broadcast signal causes the light emitting device of the user input device 32 of all of the module control systems 24 which have not yet been assigned identifiers to be switched from an OFF state to an ON state (including the light emitting device of the user input device 32 of the current module control system 24), thereby to emit light.

At step s8, the user observes the indication displayed on the user interface 23 and finds the location of the user input device 32 of the current module control system 24. The light emitted by the light emitting devices of the user input devices 32 switched on at step s6 helps the user to find the user input device 32 of the current module control system 24. The user then provides a user input at the user input device 32 of the current module control system 24. The user input device 32 receives the user input and transmits, via the second connection 35, a signal indicative of the user input to the module master controller 28. In this embodiment, the user input device 32 comprises a button, and the user provides the user input by pressing the button.

At step s10, the module master controller 28 (which has received the first broadcast signal) adopts the first identifier as its identifier in response to receiving the signal indicative of the user input. For example, the module master controller 28 may store the first identifier in its memory and configure itself to respond to commands or requests addressed to the first identifier. The module master controller 28 also changes its status from "un-commissioned" to "commissioned" (i.e. by storing in its memory information which indicates that it has been assigned an identifier) and switches off the light emitting device of its user input device 32. In addition, the user input device 32 of the current module control system is disabled by the master controller 28 so that its light emitting device does not switch on again during subsequent commissioning of controllers of other modules 10. In other words, the light emitting device remains in its OFF state during subsequent commissioning of controllers of other modules 10, thereby to indicate to the user that the current module control system 24 has already been commissioned.

At step s12, the module master controller 28 transmits to the central controller 22, via the communications network 26, an acknowledgement that the module master controller 28 has adopted the first identifier as its identifier. The acknowledgement is transmitted to the central controller 22 using an address of the central controller 22 which is indicated in the first broadcast signal. In this way, the central controller 22 is informed by the module master controller 28 that the assignment of the first identifier to the module master controller 28 has been successfully completed.

At step s14, the central controller 22 determines whether or not the current module control system 24 comprises any module slave controllers 30. In other words, the central controller 22 determines whether or not there are any module slave controllers 30 connected to the module master controller 28 via one or more first connections 34. In this embodiment, this determination is performed based on pre-stored information in the central controller 22 which indicates whether or not the current module control system 24 comprises any module slave controllers 30.

If the central controller 22 determines that there are no module slave controllers 30, the central controller 22 determines that the assigning of identifiers to the current module control system 24 is complete and the method ends. If, on the other hand, the central controller 22 determines that there are one or more module slave controllers 30, the method proceeds to step s16.

At step s16, the central controller 22 transmits, via the communications network 26, a second broadcast signal to all of the controllers in the vacuum pumping and/or abatement system 2. Thus, the module master controller 28 and the module slave controllers 30 receive the second broadcast signal via the communications network 26. The second broadcast signal is indicative of a second identifier. The second broadcast signal is also indicative of one of the outputs of the master controller 28 from the list of outputs of the master controller 28 in the pre-stored information described above. Since the indicated output corresponds to one of the first connections 34, the second broadcast signal is also indicative of that first connection 34 between the module master controller 28 and the module slave controllers 30.

At step s18, in response to the second broadcast signal, the module master controller 28 transmits, via the indicated first connection 34, a signal to the module slave controller 30 that is connected to module master controller 28 via the indicated first connection 34. More specifically, in response to the second broadcast signal, the module master controller 28 enables the indicated output corresponding to the indicated first connection 34, thereby to transmit the signal via the indicated first connection 34 to the input of the module slave controller 30 that is connected to the module master controller 28 via the indicated first connection 34.

At step s20, in response to the signal transmitted via the indicated first connection 34, the module slave controller 30 connected to the module master controller 28 via the indicated first connection 34 adopts the second identifier as its identifier. For example, the module slave controller 30 may store the second identifier in memory and configure itself to respond to commands or requests addressed to the second identifier. The module slave controller 30 also changes its status from un-commissioned to commissioned.

At step s22, the module slave controller 30 transmits to the central controller 22, via the communications network 26, an acknowledgement that it has adopted the second identifier as its identifier. The acknowledgement is transmitted to the central controller 22 using an address of the central controller 22 which is indicated in the second broadcast signal. In this way, the central controller 22 is informed by the module slave controller 30 that the assignment of the second identifier to the module slave controller 28 has been successfully completed.

At step s24, the central controller 22 determines whether or not the current module control system 24 comprises any more other module slave controllers 30. If the central controller 22 determines that there are one or more other module slave controllers 30 in the current module control system 24, the method returns to step s16 for another module slave controller 30. If the central controller 22 determines that there are no more module slave controllers 30 in the current module control system 24, the central controller 22 determines that the assigning of identifiers to the current module control system 24 is complete and the method ends.

In this way, steps s16 to s22 are sequentially repeated for each of the module slave controllers 30 of the current module control system 24, until all of the module slave controllers 30 of the current module control system 24 have been assigned different respective second identifiers.

It will be appreciated that some of the process steps depicted in the flowchart of FIG. 3 and described above may be omitted or performed in differing order to that presented above and shown in FIG. 3. Furthermore, although the process steps have, for convenience and ease of understanding, been depicted as discrete temporally-sequential steps, nevertheless some of the process steps may in fact be performed simultaneously or at least overlapping to some extent temporally.

As described above, after the above method is completed, the same method is repeated for the next module control system, and then the next module control system after that, and so on, until all of the controllers of all of the module control systems of the vacuum pumping and/or abatement system 2 have been assigned identifiers.

Thus, a method of assigning identifiers to the controllers of a vacuum pumping and/or abatement system 2 is provided.

Advantageously, the above described method tends to allow the commissioning of controllers of a vacuum pumping and/or abatement system to be performed in an efficient manner, since the controllers of each module can be assigned identifiers using a single user input at each module.

Advantageously, the above described method tends to facilitate modularity of the vacuum pumping and/or abatement system, since the controllers of each module can be assigned identifiers separately to the controllers of other modules.

Advantageously, the above described method tends to enable the module master controller and module slave controllers to not have any pre-loaded information about their location and/or identity, so that generic controllers may be used for these controllers.

In the above embodiments, the communications network is a wired communications network. However, in other embodiments, the communications network is a wireless communications network instead.

In the above embodiments, the user input device is a button. However, in other embodiments, the user input device is another type of user input device instead (e.g. a voice-controlled user input device).

In the above embodiments, the module slave controllers adopt second identifiers in response to signals received from the module master controller via the first connections. However, in other embodiments, the first connections are omitted, and the module slave controllers adopt second identifiers in response to user inputs provided at respective additional user input devices instead (in a similar manner to the way the module master controller adopts the first identifier). In these embodiments, the module slave controllers are assigned second identifiers without involvement of the module master controller.

In some embodiments, there is a time-out period for providing the user input at the user input device. In these embodiments, in response to step s6 described above, a timer is started (e.g. by the central controller 22). If a user does not provide a user input at the user input device within a predetermined amount of time from the start of the timer, the method terminates. If, on the other hand, a user does provide a user input at the user input device within the predetermined amount of time from the start of the timer, the method continues from step s10 as described above. In other words, in these embodiments, the module master controller only adopts the first identifier as its identifier if a user input is received at the user input device within a predetermined amount of time from the start of the timer.

In some embodiments, module slave controllers are omitted and so only the module master controller is assigned an identifier.

The invention claimed is:

1. A method of assigning an identifier to a controller of at least one of a modular vacuum pumping or a modular abatement system comprising a plurality of modules, the method comprising:
   determining, by a first controller of the at least one of the modular vacuum pumping or the abatement system, that a first identifier is to be assigned to one of a plurality of second controllers of the at least one of the modular vacuum pumping or the modular abatement system, wherein each of the plurality of second controllers are located at a respective one of the plurality of modules of the at least one of the modular vacuum pumping or the modular abatement system;
   transmitting, by the first controller, a first signal indicative of the first identifier to all of the second controllers;
   receiving, by a user input device coupled to each of the plurality of modules, a user input at only one of the plurality of modules;
   adopting, by the second controller, the first identifier as an identifier of the second controller at the one of the modules in response to the user input;
   determining, by the first controller, that there is a third controller connected to the second controller via a connection;
   transmitting, by the first controller, a second signal indicative of a second identifier to the second controller and the third controller, wherein the second signal is also indicative of the connection between the second controller and the third controller;
   transmitting, by the second controller via the connection between the second controller and the third controller, a signal to the third controller; and
   in response to the signal transmitted via the connection, adopting, by the third controller, the second identifier as the identifier of the third controller, wherein the adopting of the first and second identifiers allow the first and second controllers to be commissioned to control the respective one of the plurality of modules without the second and third controllers comprising any pre-loaded information.

2. The method of claim 1, further comprising:
   transmitting, by the third controller to the first controller, an acknowledgement that the third controller has adopted the second identifier as the identifier of the third controller.

3. The method of claim 2, further comprising:
   in response to the acknowledgement that the third controller has adopted the second identifier as the identifier of the third controller, transmitting, by the first controller, a further second signal indicative of a further second identifier to the second controller and a further third controller, wherein the further second signal is indicative of a connection between the second controller and the further third controller;
   transmitting, by the second controller via the connection between the second controller and the further third controller, a further signal to the further third controller; and
   in response to the further signal transmitted via the connection between the second controller and the further third controller, adopting, by the further third controller, the further second identifier as the identifier of the further third controller.

4. The method of claim 3, further comprising:
   transmitting, by the further third controller to the first controller, a further acknowledgement that the further third controller has adopted the further second identifier as the identifier of the further third controller.

5. The method of claim 1, further comprising:
   in response to determining that the first identifier is to be assigned to the second controller, displaying, by the user interface, an indication that the second controller at the one of the modules is to be assigned the first identifier.

6. The method of claim 1, further comprising:
   transmitting, by the second controller to the first controller, an acknowledgement that the second controller has adopted the first identifier as the identifier of the second controller.

7. The method of claim 1, further comprising:
   starting a timer in response to transmitting the first signal, wherein the second controller only adopts the first identifier as the identifier of the second controller if a user input is received at the user input device within a predetermined amount of time from the start of the timer.

8. The method of claim 1, wherein the user input device is a button, and the user input comprises pressing the button.

9. The method of claim 1, wherein the user input device comprises a light emitting device.

10. The method of claim 1, further comprising: controlling, by the first controller, the operation of all or part of the at least one of the modular vacuum pumping or the modular abatement system.

11. The method of claim 1,
wherein the second and third controllers are part of a module control system,
the method further comprising controlling, by the module control system, the operation of only the one of the modules of the at least one of the modular vacuum pumping or the modular abatement system.

12. The method of claim 1, wherein the first and second controllers are connected via a communications network.

13. A system for assigning an identifier to a controller of at least one of a modular vacuum pumping or a modular abatement system, the system comprising:
a plurality of modules;
a first controller;
a plurality of second controllers each located at a respective one of the plurality of modules of the at least one of the modular vacuum pumping or the modular abatement system; and
a user input device coupled to each of the plurality of modules, wherein the system is configured to:
determine, by the first controller, that a first identifier is to be assigned to one of the plurality of second controllers;
transmit, by the first controller, a first signal indicative of the first identifier to all of the second controllers;
receive, by the user input device, a user input at only one of the modules;
adopt, by the second controller, the first identifier as an identifier of the second controller at the one of the modules in response to the user input;
determine, by the first controller, that there is a third controller connected to the second controller via a connection;
transmit, by the first controller, a second signal indicative of a second identifier to the second controller and the third controller, wherein the second signal is also indicative of the connection between the second controller and the third controller;
transmit, by the second controller via the connection between the second controller and the third controller, a signal to the third controller; and
in response to the signal transmitted via the connection, adopting, by the third controller, the second identifier as the identifier of the third controller, wherein the adopting of the first and second identifiers allow the first and second controllers to be commissioned to control the respective one of the plurality of modules without the second and third controllers comprising any pre-loaded information.

14. A modular vacuum pumping or modular abatement system comprising:
a plurality of modules;
a first controller;
a plurality of second controllers each located at a respective one of the plurality of modules of the modular vacuum pumping or the modular abatement system; and
a user input device coupled to each of the modules, wherein the system is configured to:
determine, by the first controller, that a first identifier is to be assigned to one of the plurality of second controllers;
transmit, by the first controller, a first signal indicative of the first identifier to all of the second controllers;
receive, by the user input device, a user input at only one of the modules; and
adopt, by the second controller, the first identifier as an identifier of the second controller at the one of the modules in response to the user input;
determine, by the first controller, that there is a third controller connected to the second controller via a connection;
transmit, by the first controller, a second signal indicative of a second identifier to the second controller and the third controller, wherein the second signal is also indicative of the connection between the second controller and the third controller;
transmit, by the second controller via the connection between the second controller and the third controller, a signal to the third controller; and
in response to the signal transmitted via the connection, adopting, by the third controller, the second identifier as the identifier of the third controller, wherein the adopting of the first and second identifiers allow the first and second controllers to be commissioned to control the respective one of the plurality of modules without the second and third controllers comprising any pre-loaded information.

\* \* \* \* \*